H. F. T. ERBEN.
DYNAMO ELECTRIC MACHINE.
APPLICATION FILED FEB. 1, 1907.

920,846.

Patented May 4, 1909.

WITNESSES:
Lester H. Filmer
J. Ellis Elem

INVENTOR
HERMANN F. T. ERBEN.
BY Albert G. Davis
ATT'Y.

UNITED STATES PATENT OFFICE.

HERMANN F. T. ERBEN, OF SCHENECTADY, NEW YORK, ASSIGNOR TO GENERAL ELECTRIC COMPANY, A CORPORATION OF NEW YORK.

DYNAMO-ELECTRIC MACHINE.

No. 920,846.   Specification of Letters Patent.   Patented May 4, 1909.

Application filed February 1, 1907. Serial No. 355,183.

*To all whom it may concern:*

Be it known that I, HERMANN F. T. ERBEN, a citizen of the United States, residing at Schenectady, county of Schenectady, State of New York, have invented certain new and useful Improvements in Dynamo-Electric Machines, of which the following is a specification.

In certain types of dynamo electric machines it is necessary to provide means at the ends of the rotor core for supporting the end turns or connections of the rotor coils. In the so-called smooth-core machines there is a certain amount of stray flux which passes through the supporting members for the end turns, causing extremely objectionable eddy currents to be set up in such members. Where the supporting members are made of solid flange plates, such as are ordinarily used for this purpose, these eddy currents are frequently of such magnitude as to seriously impair the efficiency of the machine, as, for example, a machine designed to operate at a high speed.

The object of my invention is to prevent the losses due to such eddy currents by simple and inexpensive means and without making it necessary to materially alter the design of the machine or its parts to accomplish this end. I have found that it is possible to prevent these eddy currents by breaking the conductive continuity of the material of the end members throughout those portions which are under the influence of the stray field and very good results are obtained by simply slotting the flanged end plates at numerous points across the angle formed between the plate and the flange, the slots being arranged in planes parallel to the axis of the rotor and extending radially therefrom.

My invention will be more fully understood by the following detailed description thereof taken in connection with the accompanying drawings which show one embodiment.

Figure 1:
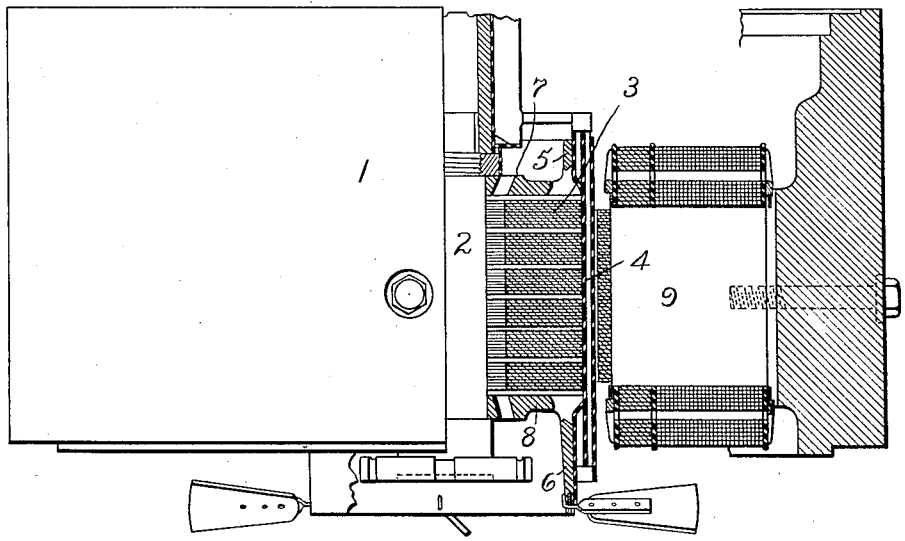
Figure 2:
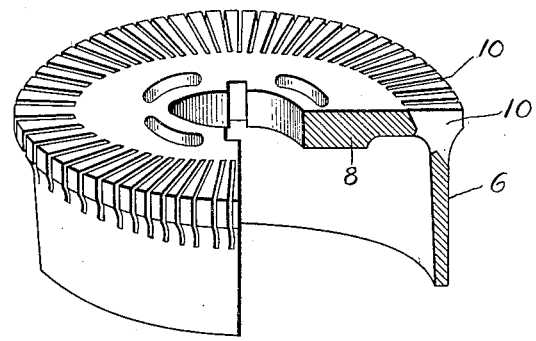

In said drawing, Figure 1 is a view partly in side elevation and partly in cross section of a portion of a machine arranged in accordance with my invention; and Fig. 2 is a perspective view with a section removed of one of the end supports.

Referring to the drawing, 1 indicates a stator of a direct current dynamo-electric machine and 2 the rotor which is of the smooth-core type. 3 is the core of the rotor. 4 represents one of the rotor coils supported at its ends upon cylindrical flanges 5 and 6, which project laterally from end-plates 7 and 8 between which the laminæ of the core may be held. The flanged end members, in order to secure mechanical strength, must be made of metal, that employed being non-magnetic and usually bronze. All of these parts, together with the construction and arrangement of the pole-pieces 9, of the stator, are, except as hereinafter specified, of old and well-known construction.

In the operation of the machine, there is a sufficient stray field passing through the meeting portions of the end plates and the flanges to cause the formation of comparatively large eddy currents in the end members. These currents may be broken up by breaking electrically-conductive continuity of the end members in order that there may be no closed circuits of any considerable length. This breaking up of the end members may be accomplished in various ways and I have found that this may be done without impairing the mechanical strength of these members, by forming a large number of slots 10 across the angle formed between the plates and the flanges extending therefrom. These slots may conveniently be arranged in planes parallel to the axis of the rotor and extending radially therefrom. Good results have been obtained by cutting the slots deep enough only to break the continuity between the metal of the plates and of the flanges in the planes of the slots. If a material stray field should extend farther from the rotor core in axial direction, the slots in the flange portions of the supporting members would of course be lengthened in the axial direction. Similarly, the slots in the end plates can be made to extend farther toward the axis in case the distribution of the stray field should make this advisable. The slots may be formed in various ways, as by casting the supporting members with the slots therein or by making saw-cuts in the members after they have been cast in solid form.

While I have illustrated only that form of my invention which I consider the simplest and most practical, I do not desire to be limited to this particular form since in its broader aspects my invention may of course take various other forms.

What I claim as new and desire to secure by Letters Patent of the United States, is:

In a dynamo-electric machine, a rotor, and an end member constructed to form an end support for the coils on said rotor consisting of an end plate having a cylindrical flange projecting from its outer edge, said end member being slotted at numerous points across the angle formed between the plate and the flange to break the conductive continuity of the end member, the said slots being arranged in planes parallel to the axis of the rotor and extending radially therefrom.

In witness whereof, I have hereunto set my hand this 30th day of January, 1907.

HERMANN F. T. ERBEN.

Witnesses:
BENJAMIN B. HULL,
HELEN ORFORD.